(No Model.)
J. S. WOODWARD.
WATERING TROUGH.
No. 535,878. Patented Mar. 19, 1895.
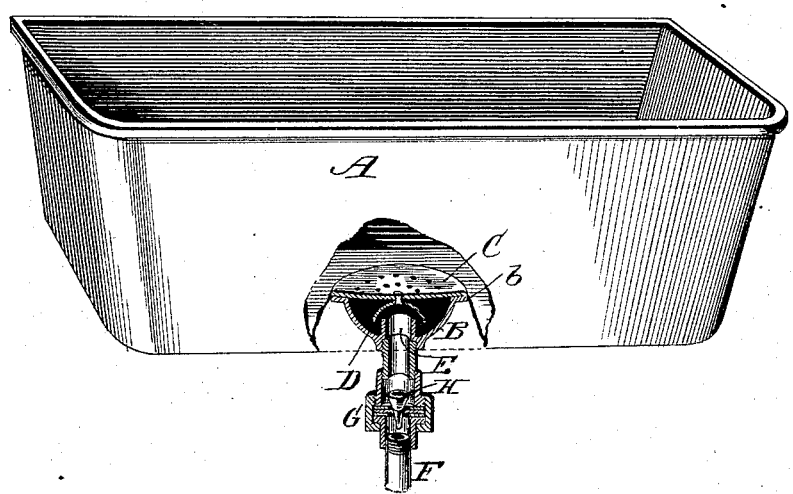
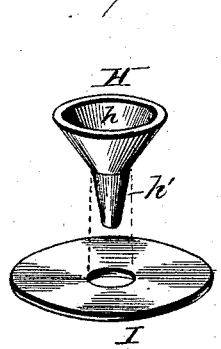
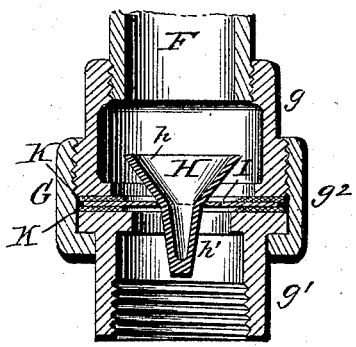
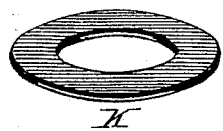
Witnesses
C. J. Williamson
Wm B. Grant
Inventor
Jabez S. Woodward,
per Chas. N. Fowler
Attorney.

UNITED STATES PATENT OFFICE.

JABEZ S. WOODWARD, OF LOCKPORT, NEW YORK.

WATERING-TROUGH.

SPECIFICATION forming part of Letters Patent No. 535,878, dated March 19, 1895.

Application filed December 27, 1894. Serial No. 533,112. (No model.)

*To all whom it may concern:*

Be it known that I, JABEZ S. WOODWARD, a citizen of the United States, residing at Lockport, in the county of Niagara and State of New York, have invented certain new and useful Improvements in Watering-Troughs; and I do hereby declare that the following is a full, clear, and exact description of the same, reference being had to the annexed drawings, making a part of this specification, and to the letters of reference marked thereon.

This invention relates generally to watering troughs for stock and particularly to an improved trap, and an improved valve for regulating the in and out flow of water to the trough.

The object of my invention is to provide a trough which will have a smooth bottom and can consequently be kept clean, the trap being located in a depression formed below the level of the bottom.

Another object of my invention is to provide an exceedingly sensitive valve, which will permit the water to flow very slowly into the trough and will completely prevent its escape.

With these objects in view my invention consists of a tank or trough formed with a depression in its bottom and a bell trap located in said depression, a supply pipe, having a union joint and a double conical hollow rubber valve arranged in said union to permit the ingress and prevent the egress of water therethrough.

My invention consists also in certain details of construction and combination of parts all of which will be fully described and then pointed out in the claims.

In the drawings forming a part of this specification: Figure 1 is a perspective view with part of the tank broken away showing the trap, pipe, and valve in section. Fig. 2 is a detail sectional view of the valve seat and union. Fig. 3 is a detail view of the valve and its seat detached and Fig. 4 is a detail view of a packing ring.

In the practical embodiment of my invention I employ a tank or trough A preferably constructed of cast iron and made any suitable size. The bottom is formed with a central depression or basin B which has a rabbet $b$ at its upper edge and into which fits a strainer plate C carrying a bell shaped trap D upon its bottom which covers the end of a tubular section E formed at the lower end of the depression or basin. The supply pipe F is screwed into the lower end of the tubular section, said pipe being made in two sections and between said sections I interpose a coupling G containing the regulating valve H. The coupling G consists of the upper section $g$ and lower section $g'$ and connecting collar $g^2$, the upper section being made without a lip to permit the movement of the valve, and upon the lip of the lower section rests the metallic valve seat I, said valve seat being held between two packing rings K made of asbestos and preferably filled with paraffine to prevent swelling, the valve seat and packing rings being securely held between the upper and lower sections of the coupling.

The valve H is made hollow, of soft rubber and in the form of a double cone, consisting of an upper wide conical portion $h$ and a lower narrow conical portion $h'$ closed at its lower end. The form of the valve permits the water to pass up through the coupling but it cannot return as the conical valve being hollow will hold the water, receive the back pressure and firmly seat the valve; and the valve being of soft rubber will also expand a limited extent and thus aid the seating of the valve. The valve seat is formed with an opening just large enough to permit the lower portion of the valve to work therein, so that the water passes through very slowly, and by this arrangement when a single animal drinks from a small tank it will be emptied, and thus the water will be fresh after each operation. The valve being hollow seats automatically by the pressure of the water contained within the tank so that when said tank is full the valve is seated but the moment any water is drawn off the valve is unseated, and the fall of one-half of an inch in the tank is sufficient to operate said valve.

By having the bottom of the tank smooth it can be kept perfectly clean and by having the strainer trap arranged as shown and described all sediment will be collected and the trap can be easily cleaned when so desired.

Having thus described my invention, what I claim, and desire to secure by Letters Patent, is—

1. In a stock watering tank, the combination with a coupling, of a valve seat held therein and a hollow double conical rubber valve, closed at the bottom and adapted to rest with said closed end downward, substantially as shown and described.

2. In a stock watering tank, the combination with a coupling, of a valve seat arranged therein and a hollow soft rubber double conical valve consisting of a broad upper portion and a narrow lower portion closed at its lower end, substantially as shown and described.

3. In a stock watering tank the combination with the coupling made in two parts, of the valve seat and packing rings and, a hollow, soft, rubber, double conical valve, closed at its lower end, substantially as shown and described.

In testimony that I claim the above I have hereunto subscribed my name in the presence of two witnesses.

JABEZ S. WOODWARD.

Witnesses:
FRED D. MORRIS,
J. MILTON UNDERARD.